United States Patent [19]

Stern

[11] 4,040,822
[45] Aug. 9, 1977

[54] ALUMINUM BASE FLUXLESS BRAZING ALLOY

[75] Inventor: Marvin J. Stern, Seattle, Wash.

[73] Assignee: Alloy Metals, Inc., Troy, Mich.

[21] Appl. No.: 620,091

[22] Filed: Oct. 6, 1975

Related U.S. Application Data

[63] Continuation-in-part of Ser. No. 433,016, Jan. 10, 1974, abandoned.

[51] Int. Cl.² .............................................. C22C 21/12
[52] U.S. Cl. ........................................ 75/140; 75/142; 75/147
[58] Field of Search ................. 75/147, 138, 140, 142, 75/143, 148; 148/32, 32.5

[56] References Cited

U.S. PATENT DOCUMENTS 3,440,712   4/1969   Stroup et al. .......................... 75/138

*Primary Examiner*—R. Dean
*Attorney, Agent, or Firm*—Cullen, Settle, Sloman & Cantor

[57] ABSTRACT

A family of ductile, non-aggressive, low temperature brazing alloys, particularly suitable for brazing and diffusion-welding aluminum alloys, titanium alloys, beryllium alloys, boron-borsic-graphite composite structures to such alloys, diamond bonding and dissimilar metal joints of aluminum, titanium or steels. The family of aluminum base brazing alloys include, by weight, 0.1 to 5% magnesium, 0.1 to 5% rare earth, 4 to 15% silicon and an addition of 1 to 9% tin, 0.3 to 5% copper, 2 to 10% palladium, 1 to 6% gallium, 1 to 8% silver or 0.1 to 0.25% bismuth or strontium, with the balance aluminum. Where the addition is palladium, the silicon content may be 0 to 12%.

17 Claims, No Drawings

ALUMINUM BASE FLUXLESS BRAZING ALLOY

FIELD OF THE INVENTION

This application is a continuation in part of my co-pending application for U.S. Pat. Ser. No. 433,016, filed Jan. 10, 1974, now abandonded.

The brazing alloys of this invention are particularly, although not exclusively adapted for fluxless brazing or low temperature diffusion-welding aluminum, titanium, beryllium and boron-borsic-graphite fiber composites to themselves or to each other. The brazing alloys of this invention are also suitable for other applications, including bonding of ceramics to ceramics or to titanium, aluminum, beryllium or steel members in ceramic-metal joints, joining steel to aluminum or titanium and the bonding of diamonds to various metal or ceramic substrates.

The aluminum brazing alloys disclosed by the prior art and inventions generally braze at temperatures of 1060° to 1125° F or higher and the brazed joint is subject to embrittlement, erosion and degradation at moderate elevated temperature service. These and other problems with aluminum brazing have restricted the use of aluminum, titanium or bi-metal joints in many applications where the use of such joints would be particularly suitable because of the high strength to weight ratio. The disclosed brazing alloys will substantially improve the potential of aluminum, titanium, etc. in many structural applications including the use of extremely thin section, light-weight structures such as honeycomb, composites and foil heat exchangers.

The prior art includes aluminum-silicon brazing alloys which have substantial erosion and embrittlement problems and require a flux in aluminum brazing. Magnesium vapor from external sources or furnace containers, gaseous fluxes or incorporation of magnesium over 0.4% by weight of an aluminumsilicon braze cladding, foil or wire filler have been used to improve the bonding characteristics of aluminum and other metal parts. Another problem with the aluminum brazing alloys disclosed by the prior art has been that the silicon, and the relatively high magnesium contents required, causes diffusion into and reaction with the aluminum base metal, causing serious degradation and embrittlement and preventing the formation of smooth, cosmetic surfaces. Further, the alloy is relatively brittle after brazing which makes use of such alloys difficult in thin section joints or where post-braze forming is required. Rare earths up to 1% by weight, total, have been added to aluminum braze alloys in conjunction with silicon additions to promote brazing both with and without fluxes. Brazing has also been accomplished by investigators using richer concentrations of rare earths, but generally, braze temperatures in excess of 1100° F are required which seriously limit the use of such alloys. A German series of fluxless brazing alloys have been developed to work in gaseous atmospheres which consist of aluminumsilicon alloys modified with small percentages (around 0.1–0.2% by weight), of bismuth, barium, strontium or antimony. All these alloys have high brazing temperatures over 1080° F and thus are limited in application.

SUMMARY OF THE INVENTION

The brazing alloys of this invention are aluminum base alloys containing combinations of magnesium and rare earth, with the addition of other elements, preferably tin or gallium in sufficient concentrations to provide many advantages which are not found in the prior art. The basic alloys comprise, by weight, about 0.1 to 5% rare earth, 0.1 to 5% magnesium and the addition of at least one of the following elements; 4 to 15% silicon, 1 to 9% tin, 0.3 to 5% copper, 2 to 10% palladium, 1 to 6% gallium, 1 to 8% silver and 0.1 to 0.25% bismuth or strontium for controlling braze temperature, wetting, heat treatment response, braze alloying barriers or corrosion resistance. The balance of all brazing alloys is aluminum. The total weight percent magnesium, rare earth and tin should be at least one percent in the preferred embodiment, the total ranges from 2.5 to 3%.

Although most of the alloys covered by this invention contain 5 to 15% silicon, a silicon-free alloy with 2 to 10%, preferably 6 to 8% palladium plus magnesium and rare earth additions to the aluminum base has been particularly effective in brazing and diffusion-welding titanium and borsic composite structures and effectively prevents degradation of the borsic fibers.

The aluminum brazing alloys are particularly non-agressive and, by promoting formation of a globular or spheroidized aluminum-silicon eutectic structure, minimize silicon diffusion into the base metal, improve braze wetting and flow, minimize braze alloy erosion characteristics and provide tough, ductile, malleable braze foil and wire application forms. These alloys can be readily made into dry-atomized powders for application by tapes, pastes, slurries, electrostatic spraying, plasma spraying or roller-coat techniques.

The brazing alloys of this invention also reduce the braze temperatures, which fact is of particular importance in the field of brazing aluminum, titanium and composite structures. The aluminum-silicon brazing alloys made with the prior art brazed at approximately 1060°-1090° F and above. Although elemental aluminum melts at 1210° F, the majority of aluminum base-metal alloys melt at approximately 1100° F or below. The commercial aluminum-silicon-magnesium braze alloys with or without copper and zinc additions are therefore unsuitable for many aluminum, titanium or composite structures where brazing under 1030° F is desired for maximum property characteristics. The aluminum brazing alloys of this invention braze at temperatures from 1080° F to 1015° F and diffusionbond at temperatures of 960° F, substantially improving the range of alloys which may be brazed.

In addition to the basic use of various percentages of rare earths and magnesium, coupled with other common additives to achieve customized properties, the discovery of the benefits of various tin additions to 12% by weight is also one of the key claims of this invention. Tin has also been found to enhance the fluxless brazing action of the rare earth and magnesium additives as well as having a considerable effect in reducing the alloy solidus-liquidus temperatures to around 1013° F liquidus and the solidus temperature to around 850° F. Gallium has also been found to be a key additive for reducing braze temperatures and promoting braze flow without the need for fluxes.

The method of this invention includes contacting the metal parts to be joined, applying the preferred brazing alloy and heating the parts to below the melting temperature of the metal parts and above the brazing temperatures of the alloy. It is important to note that this procedure is not often possible in aluminum brazing with the aluminum-silicon brazing alloys commercially available because the brazing temperature is above the melting temperature of the majority of aluminum alloys.

Other advantages and meritorious features of the disclosed brazing alloy and method of this invention will be found in the following description of the preferred embodiment and the appended claims.

DETAILED DESCRIPTION OF THE PREFFERED EMBODIMENTS

The preferred fluxless brazing alloy of this invention may be formed by induction melting of the elemental constituents, forming a homogeneous alloy metal. The alloy may then be formed into foil or wire because of the extreme ductility and malleability of the alloy. Alternatively, the brazing alloy may be melted and atomized into a powder or ground. The brazing alloy may then be applied directly to the parts to be joined and heated, or the metal alloy powder may be applied in a paste. It is important to note that the preferred brazing alloys of this invention do not require a brazing flux, which is required with the commercial aluminum-silicon brazing alloys.

The family of aluminum base brazing alloys of this invention include, by weight, 0.1 to 5% magnesium, 0.1 to 5% rare earth, 4 to 15% silicon and the additon of at least one of the following elements, with the balance aluminum:

| Material | Acceptable Range | Preferred Range |
|---|---|---|
| Tin | 1 to 9% | 1 to 3% |
| Gallium | 1 to 6% | 3 to 5% |
| Palladium | 2 to 10% | 6 to 8% |
| Copper | 0.3 to 5% | 3 to 4% |
| Silver | 1 to 8% | 1 to 3% |
| Bismuth or Strontium | 0 to 0.25% | 0.1 to 0.25% | wherein the minimum percent of the addition or optional elements is zero.

As described above, a silicon free alloy has also been developed, particularly for brazing and diffusion-welding titanium and borsic composite structures having 2 to 10% palladium and preferably 6 to 8% palladium.

The basic composition of the brazing alloys of this invention includes 0.10 to 5% by weight rare earth. About 2 to 2.5% by weight rare earth has been found to be particularly suitable for the brazing alloys of this invention. Suitable rare earth includes lanthanum, praseodymium, yttrium, and mischmetal. The elemental rare earths may be used in either the refined or oxide form. Mischmetal is naturally occuring rare earth including 40 to 75% by weight cerium with varying amounts of lanthanum, yttrium, neodymium and prasceodymium. One analysis of mischmetal included 53 to 56% by weight cerium, 24% by weight lanthanum, 10 to 15% by weight yttrium and trace elements.

The rare earths provide several advantages to the brazing alloy of this invention. The rare earths serve as a "getter", deoxidizing the melt. Further, the rare earths serve as a temperature depressant and provide a finer grain in the brazed joint. The brazed joints have improved elevated temperature service capabilities and the rare earths serve as a barrier to diffusion of the silicon into the base metal. There are further unexpected advantages provided by the combination of rare earths with magnesium in the aluminum base brazing alloy. The rare earths, particularly lanthanum, provide an unexpected advantage in the brazed joint. The resultant braze has a finer grain than brazed joints utilizing the present aluminum braze alloys. Also the aluminum-magnesium-silicon-rare earth precipitate has a spheroidized, ductile structure rather than the common platelet-eutectic structure of the aluminum-silicon alloys.

The preferred range of magnesium in the brazing alloy of this invention is about 0.10 to 5% by weight. A range of 0.3 to 5% has been found particularly suitable for aluminum brazing alloys. The magnesium functions as an activator to promote fluxless brazing and a brazing supressant, lowering the brazing temperature. As stated above, this is a particularly important feature of the brazing alloy of this invention. The magnesium also promotes corrosion resistance, which has been a particularly problem with the aluminum silicon brazing alloys commercially available.

The preferred fluxless brazing alloy for brazing aluminum and aluminum base alloys includes 1 to 9% by weight tin and preferably about 1 to 3% by weight tin. Concentrations of tin above about 9% have been found to be too brittle for many applications. However, as described above, other elements may be substituted for tin, particularly for special applications, as described below. First, the basic composition may include 0.3 to 5% by weight copper, preferably about 3 to 4%. The copper improves the heat treat response of the alloy and has a minor affect on the brazing temperature. Concentrations of copper below the stated range does not result in the desired precipitation in brazing and has little or no effect. Concentrations above the stated range results in brittleness and reduced corrosion resistance. The brazing alloy may also include gallium, particularly for special purpose brazing alloys. Gallium may be added in concentrations of 1 to 6% by weight and preferably 3 to 5%. The addition of silver reduces the brazing temperature and improves the fluidity and corrosion resistance of the brazing alloy. Silver may be added in concentrations of 1 to 8% by weight, preferably 1 to 3%. Additions of over 8% results in a brazing temperature which is too high for many applications and additions of less than 1% have little effect upon the preferred brazing alloy. Bismuth and strontium are added to the brazing alloy of this invention for controlling the brazing temperature, wetting, etc. as described above. Bismuth and strontium, where added, are preferably added in concentrations of 0.1 to 0.25% by weight.

The following examples illustrate the fluxless aluminum brazing alloys of this invention with the addition of tin. In each example, the materials were heated by conventional inudction melting techniques, forming a metal alloy. The brazing alloy was then applied without flux to the surfaces of the parts to be brazed, and brazed in vacuum, argon, helium or nitrogen atmospheres forming a good bond having excellent elevated temperature service capabilities. In each example, the percent composition is by weight.

| Material | Percent |
|---|---|
| Example 1: | |
| Silicon | 10 |
| Magnesium | 0.33 |
| Rare earth (mischmetal) | 2 |
| Tin | 2 |
| Aluminum | Balance |
| Example 2: | |
| Silicon | 10.3 |
| Magnesium | 0.90 |
| Rare earth (mischmetal) | 2.4 |
| Tin | 2 |
| Aluminum | Balance |
| Example 3: | |

-continued

| Material | Percent |
|---|---|
| Copper | 3.2 |
| Silicon | 5.6 |
| Magnesium | 0.3 |
| Rare earth (lanthanum) | 1.9 |
| Tin | 4.0 |
| Aluminum | Balance |
| Example 4: | |
| Silicon | 10.7 |
| Magnesium | 0.31 |
| Rare earth (lanthanum) | 2.0 |
| Copper | 3.8 |
| Aluminum | Balance |
| Example 5: | |
| Silicon | 10.0 |
| Magnesium | 0.38 |
| Rare earth (mischmetal) | 0.60 |
| Copper | 2.60 |
| Tin | 1.60 |
| Aluminum | Balance |
| Example 8: | |
| Silicon | 11.0 |
| Magnesium | 0.30 |
| Rare Earth (mischmetal) | 1.25 |
| Tin | 8.0 |
| Copper | 2.75 |
| Silver | 2.5 |
| Aluminum | Balance |
| Example 9: | |
| Magnesium | 0.3 |
| Silver | 2.5 |
| Tin | 7.0 |
| Rare earth (mischmetal) | 1.25 |
| Silicon | 10.5 |
| Copper | 2.5 |
| Aluminum | Balance |

The addition of tin further lowers the brazing temperature. The aluminum brazing alloys listed in the above examples are ductile, non-agressive low temperature brazing alloys which provide a considerable improvement over the brazing alloys disclosed by the prior art. As stated above, the brazing alloy may also be utilized for composite brazing of aluminum with other metals, including titanium and beryllium. The resultant braze has a particular fine grain and is stronger and tougher than the brazed joints utilizing the brazing alloys disclosed by the prior art. Further, and most important, brazed joints utilizing the aluminum base brazing alloy of this invention has improved elevated temperature service capabilities.

The aluminum base brazing alloy of this invention may also be utilized for brazing titanium and composite fusion bonding of titanium with other metals, such as borsic composites. One example of an aluminum base brazing alloy for brazing titanium is as follows.

| Material | Percent |
|---|---|
| Example 10: | |
| Magnesium | 0.9 to 1.5 |
| Rare earth (lanthanum) | 2 to 2.5 |
| Palladium | 6 to 8 |
| Aluminum | Balance. |
| Example 11: | |
| Silicon | 10.5 |
| Magnesium | 0.36 |
| Rare earth (mischmetal) | 1.7 |
| Palladium | 5 |
| Aluminum | Balance. |

The alloys of Examples two through seven have all shown excellent brazeability and mechanical properties when used on various titanium alloy honeycomb structures for aircraft applications.

The following examples of the brazing alloy of this invention have been formulated without tin or palladium, but each example includes the combination of magnesium, rare earth, silicon and an addition of copper, gallium, silver, bismuth and strontium, with the balance aluminum. As stated above, all of the percentages are in weight percent.

| Material | Percent |
|---|---|
| Example 12: | |
| Magnesium | 0.3 |
| Rare earth (mischmetal) | 2 |
| Silicon | 10 |
| Silver | 2 |
| Aluminum | Balance. |
| Example 13: | |
| Magnesium | 0.3 |
| Rare earth (lanthanum) | 2 |
| Silicon | 10.5 |
| Copper | 3.8 |
| Aluminum | Balance. |
| Example 14: | |
| Magnesium | 0.3 |
| Rare earth (mischmetal) | 2 |
| Silicon | 10.5 |
| Bismuth | 0.2 |
| Copper | 3.8 |
| Aluminum | Balance. |
| Example 15: | |
| Magnesium | 0.3 |
| Rare earth (lanthanum) | 2 |
| silicon | 11 |
| Gallium | 5 |
| Copper | 4 |
| Aluminum | Balance. |

It will be understood that the brazing alloy of this invention may also be utilized for other applications. It has been recently discovered that aluminum braze alloys may be utilized in securing diamonds, for example. See U.S. Pat. No. 3,678,568.

I claim:

1. A fluxless brazing alloy suitable for brazing aluminum, having a brazing temperature of about 1080° F, or less, consisting essentially of, by weight:

| | | | |
|---|---|---|---|
| 4 | to | 15% | Silicon |
| 0.1 | to | 5% | Magnesium |
| 0.1 | to | 5% | Rare earth |
| 1 | to | 3% | Tin |
| 0 | to | 6% | Gallium |
| 0 | to | 10% | Palladium |
| 0 | to | 5% | Copper |
| 0 | to | 8% | Silver |
| 0 | to | 0.25% | Bismuth |
| 0 | to | 0.25% | Strontium, and |
| the Balance | | | Aluminum. |

2. The brazing alloy defined in claim 1, wherein said alloy contains about 2% by weight rare earth.

3. A brazing alloy particularly suitable for brazing titanium and related materials, consisting essentially of, by weight:

| | | | |
|---|---|---|---|
| 0.1 | to | 5% | Magnesium |
| 2 | to | 2.5% | Rare earth |
| 6 | to | 8.0% | Palladium |
| 0 | to | 12.0% | Silicon |
| 0 | to | 9% | Tin |
| 0 | to | 6% | Gallium |
| 0 | to | 5.0% | Copper |
| 0 | to | 8% | Silver |
| 0 | to | 0.25% | Bismuth |
| 0 | to | 0.25% | Stronthium, and |
| the Balance | | | Aluminum. |

4. A fluxless brazing alloy suitable for brazing aluminum, consisting essentially of about, by weight:

| | |
|---|---|
| 10% | Silicon |

| | | |
|---|---|---|
| 0.33% | | Magnesium |
| 2% | | Rare earth |
| 2% | | Tin |
| the Balance | | Aluminum. |

5. A fluxless brazing alloy suitable for brazing aluminum, consisting essentially of about, by weight:

| | |
|---|---|
| 10.3 % | Silicon |
| 0.90% | Magnesium |
| 2.4% | Rare earth |
| 2% | Tin |
| the Balance | Aluminum. |

6. A fluxless brazing alloy suitable for brazing aluminum, consisting essentially of about, by weigh:

| | |
|---|---|
| 3.2 % | Copper |
| 5.6 % | Silicon |
| 0.3 % | Magnesium |
| 1.9 % | Rare earth |
| 4.0 % | Tin |
| the Balance | Aluminum. |

7. A fluxless brazing alloy, suitable for brazing aluminum, consisting essentially of about, by weight:

| | |
|---|---|
| 10.0 % | Silicon |
| 0.38% | Magnesium |
| 0.60% | Rare earth |
| 2.60% | Copper |
| 1.60% | Tin |
| the Balance | Aluminum. |

8. A fluxless brazing alloy suitable for brazing aluminum, consisting essentially of about, by weight:

| | |
|---|---|
| 11.0 % | Silicon |
| 0.30% | Magnesium |
| 1.25% | Rare earth |
| 8.0 % | Tin |
| 2.75% | Copper |
| 2.5 % | Silver |
| the Balance | Aluminum. |

9. A fluxless brazing alloy suitable for brazing aluminum, consisting essentially of about, by weight:

| | |
|---|---|
| 0.3 % | Magnesium |
| 2.5 % | Silver |
| 7.0 % | Tin |
| 1.25% | Rare earth |
| 10.5 % | Silicon |
| 2.5 % | Copper |
| the Balance | Aluminum. |

10. A brazing alloy consisting essentially of, by weight:

| | | | |
|---|---|---|---|
| 4 | to | 15% | Silicon |
| 0.1 | to | 5% | Magnesium |
| 0.1 | to | 5% | Rare earth |
| 1 | to | 9% | Tin |
| 0 | to | 6% | Gallium |
| 0 | to | 10% | Palladium |
| 0 | to | 5% | Copper |
| 0 | to | 8% | Silver |
| 0 | to | 0.25% | Bismuth |
| 0 | to | 0.25% | Strontium, and |
| the Balance | | | Aluminum. |

11. A brazing alloy particularly suitable for brazing titanium and related materials, consisting essentially of, by weight,

| | | | |
|---|---|---|---|
| 0.1 | to | 5% | Magnesium |
| 2 | to | 2.5% | Rare earth |
| 2 | to | 10.0% | Palladium |
| 0 | to | 12.0% | Silicon |
| 0 | to | 9% | Tin |
| 0 | to | 6% | Gallium |
| 0 | to | 5.0% | Copper |
| 0 | to | 8% | Silver |
| 0 | to | 0.25% | Bismuth |
| 0 | to | 0.25% | Strontium, and |
| the Balance | | | Aluminum. |

12. A fluxless brazing alloy, consisting essentially of, by weight:

| | | | |
|---|---|---|---|
| 4 | to | 15% | Silicon |
| 0.1 | to | 5% | Magnesium |
| 0.1 | to | 5% | Rare earth |
| 0 | to | 9% | Tin |
| 0 | to | 6% | Gallium |
| 0 | to | 10% | Palladium |
| 0 | to | 5% | Copper |
| 1 | to | 8% | Silver |
| 0 | to | 0.25% | Bismuth |
| 0 | to | 0.25% | Strontium, and |
| the Balance | | | Aluminum. |

13. The brazing alloy defined in claim 12, wherein the concentration of silver is 1 to 3% by weight.

14. A brazing alloy consisting essentially of, by weight:

| | | | |
|---|---|---|---|
| 4 | to | 15% | Silicon |
| 0.1 | to | 5% | Magnesium |
| 0.1 | to | 5% | Rare earth |
| 0 | to | 9% | Tin |
| 0 | to | 6% | Gallium |
| 0 | to | 10% | Palladium |
| 0 | to | 5% | Copper |
| 0 | to | 8% | Silver |
| 0.1 | to | 0.25% | Bismuth |
| 0 | to | 0.25% | Strontium, and |
| the Balance | | | Aluminum. |

15. A brazing alloy consisting essentially of, by weight,

| | | | |
|---|---|---|---|
| 4 | to | 15% | Silicon |
| 0.1 | to | 5% | Magnesium |
| 0.1 | to | 5% | Rare earth |
| 0 | to | 9% | Tin |
| 0 | to | 6% | Gallium |
| 0 | to | 10% | Palladium |
| 0 | to | 5% | Copper |
| 0 | to | 8% | Silver |
| 0 | to | 0.25% | Bismuth |
| 0.1 | to | 0.25% | Strontium, and |
| the Balance | | | Aluminum. |

16. A fluxless brazing alloy suitable for brazing aluminum, consisting essentially of, by weight, 0.1 to 5% Magnesium, 4 to 15% silicon, about 2% rare earth and which may include one or more of the following additions, by weight, 1 to 9% tin, 0.3 to 5% copper, 2 to 10% palladium, 1 to 6% gallium, 1 to 8% silver and 0.1 to 0.25% bismuth or strontium, with the balance aluminum.

17. A fluxless brazing alloy suitable for brazing aluminum, consisting essentially of, by weight, 0.1 to 5% magnesium, 0.1 to 5% rare earth, 4 to 15% silicon and an addition of one of the following by weight, 1 to 9% tin, 2 to 10% palladium, 1 to 8% silver or 0.1 to 0.25% bismuth or strontium, with the balance being aluminum.

* * * * *